(12) United States Patent
Andes et al.

(10) Patent No.: US 7,060,126 B2
(45) Date of Patent: Jun. 13, 2006

(54) MULTILAYERED LUSTER PIGMENTS

(75) Inventors: Stephanie Andes, Hanau (DE); Gerald Fuchs-Pohl, Weiterstadt (DE); Martin Friz, Darmstadt (DE); Gerhard Pfaff, Munster (DE); Siegfried Raabe, Griesheim (DE); Michael Uhlig, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 519 days.

(21) Appl. No.: 10/166,715

(22) Filed: Jun. 12, 2002

(65) Prior Publication Data

US 2003/0005859 A1 Jan. 9, 2003

(30) Foreign Application Priority Data

Jun. 12, 2001 (DE) .......................................... 101 28 489

(51) Int. Cl.
*C04B 1/62* (2006.01)

(52) U.S. Cl. ....................... 106/415; 106/403; 106/404; 106/419; 106/436; 106/442; 106/453; 106/454; 106/456; 106/457; 106/459; 106/480

(58) Field of Classification Search .................. 106/403, 106/404, 415, 419, 436, 442, 453, 454, 456, 106/457, 459, 480

See application file for complete search history.

(56) References Cited

U.S. PATENT DOCUMENTS 5,607,504 A * 3/1997 Schmid et al. ............... 106/403
6,238,471 B1 * 5/2001 Vogt et al. ................... 106/417

\* cited by examiner

*Primary Examiner*—C. Melissa Koslow
*Assistant Examiner*—Shalie Manlove
(74) *Attorney, Agent, or Firm*—Millen, White, Zelano & Branigan, P.C.

(57) ABSTRACT

The invention relates to multilayered luster pigments based on metallic substrates, which are completely surrounded by a plurality of layers, where these layers comprise at least one layer pack (A) having a colorless dielectric layer of a material with a refractive index n of ≦1.8, and a colorless dielectric layer of a material with a refractive index n of >1.8, and a selectively or non-selectively absorbent layer (B), and to a process for their production, and to their use.

28 Claims, No Drawings

MULTILAYERED LUSTER PIGMENTS

The invention relates to multilayered luster pigments based on metallic substrates, to a process for their production, and to their use.

Multilayered luster pigments having central layers of reflective materials, in particular metals, are known and are widely used in many areas of industry, for example, for the production of automotive paints and decorative coating materials and for the pigmentation of plastics, paints, printing inks, paper, in particular, for security printing, and the like.

JP H7-759(A) discloses a multilayered interference pigment having metallic luster, which consists of an aluminum substrate, gold or silver platelets or platelets of mica or glass, which are coated with metals, and alternating layers of titanium dioxide and silicon dioxide located thereon. This pigment has high hiding power. However, the metallic core reflects the incident light to a very great extent, and consequently the interference effect caused by the metal oxide layers is only evident to a very small extent and the hard metallic luster dominates the appearance of the pigments.

U.S. Pat. No. 4,434,010 describes pigments having a central layer of an opaque, reflective material, for example aluminum, gold, copper or silver, which are coated on both sides with a first layer of a low-refractive-index, dielectric material, such as silicon dioxide, magnesium fluoride or aluminum oxide, and a second, semi-opaque metal layer of chromium, nickel or Inconel.

These pigments are employed primarily for the printing of security documents and exhibit colors which vary with the viewing angle. They, however, because of their production process, are not completely surrounded by the outer layers on all sides of the metal core, which can result in processing problems in coating solutions.

Pigments that comprise a multilayered interference film and have a color shift are described in U.S. Pat. No. 6,157,489. They have a central reflection layer of, for example, aluminum, silver, or copper to which layers of high-refractive-index dielectric materials, for example, titanium dioxide, zinc sulfide or yttrium oxide are applied on both sides, and an absorption layer of chromium, nickel, palladium, titanium, etc., is applied thereto. These pigments likewise have substrates which are not completely surrounded by the outer layers, which again means that processing problems can occur.

DE 44 37 753 discloses multicoated metallic luster pigments that have, on metallic substrates, a layer pack comprising (A) a colorless coating having a refractive index n of $\leq 1.8$, and
(B) a selectively absorbent coating having a refractive index n of $\geq 2.0$, and, optionally
(C) an outer, colorless or selectively absorbent coating which is different from the underlying layer (B).

Layer (A) here consists of, for example, silicon dioxide, aluminum oxide or magnesium fluoride, while layer (B) is composed of selectively absorbent, high-refractive-index oxides or of "tinted" colorless high-refractive-index oxides. These pigments are said to have interesting coloristic properties and are suitable for producing a color flop, i.e., a varying colored appearance depending on the viewing angle.

A common feature of the pigments disclosed in the last three mentioned publications is that the interference color of the pigments is determined essentially by the refractive index and thickness of the first layer on the metallic substrate, which has either a low or high refractive index, and by the color absorption of the layer located thereon. The angle dependence and the color intensity of the interference color are, by contrast, controlled only by the composition and thickness of the first layer. Influencing means which enable fine adjustment of the color intensity of the interference color and/or the width of the range in which an angle-dependent color flop takes place are therefore missing.

One object of the invention is therefore to provide multilayered luster pigments based on metallic substrates, which have high hiding power, high color intensity and/or strong angle dependence of the interference color over a broad range, and whose desired color properties can be adjusted in a simple manner. A further object is to provide a process for their production and to indicate suitable potential uses.

This and other objects are achieved with the invention by the use of multilayered luster pigments comprising a metallic substrate and a plurality of layers, each of which completely surrounds the substrate, i.e., covers it on all sides, comprising, (A) at least one layer pack consisting of
  i) a colorless dielectric layer of a material having a refractive index n of $\leq 1.8$, and
  ii) a colorless dielectric layer of a material having a refractive index n of $>1.8$, and
(B) a selectively or non-selectively absorbent layer.

The luster pigments according to the invention may optionally have an outer layer (C).

The invention likewise relates to a process for the preparation of the above-defined luster pigments in which metallic substrates are coated with layers (A), (B) and optionally (C) by wet-chemical methods, for example, by precipitation, hydrolysis, or reduction of metal salts in an aqueous or organic medium and/or by CVD or PVD methods.

The invention furthermore relates to the use of the pigments according to the invention in paints, coatings, printing inks, plastics, cosmetic formulations, ceramic materials, glasses, paper, for laser markings and for security applications.

The metallic substrate is opaque to light and reflective, and may comprise all metals and alloys that have metal effects, preferably in platelet form, for example, iron, and steel, in particular, stainless steel, aluminum, copper, nickel, chromium, zinc, tin, silver, gold, platinum, cobalt, lanthanides and titanium, and mixtures or alloys of two or more metals, such as brass and bronze. All known commercially available metal powders, which are substantially stable in water or can be stabilized by suitable measures, are particularly suitable.

Preference is given here to platelet-shaped aluminum particles, which are accessible in a simple manner by conventional techniques, such as the stamping-out of foils or by atomization and grinding methods. It is also possible for aluminum foils to be broken and ground, or coarse aluminum particles to be comminuted to the desired size and subsequently classified. For the production of particles of this type, the processes described in U.S. Pat. No. 3,949,139 and WO 00/24946 are particularly suitable, for example.

If, however, standard commercial products made from the above-mentioned metals are employed, their surfaces should be substantially grease-free, which can be achieved by treatment with suitable solvents or by oxidative treatment, for example, as described in DE-A-42 23 384. It is also preferred for the metallic substrates to be subjected to a passivation treatment before the coating, as described, for example, in DE 42 36 332 and DE 44 14 079. This facilitates the use of the pigments according to the invention also in aqueous coating systems without problems.

The size of the metallic substrate particles is matched to the particular application of the pigments according to the invention and is not crucial per se. The average diameter of the substrate particles is preferably in the range of about 1 to 250 µm, more preferably about 2 to 200 µm, and in particular about 5 to 50 µm, while the average thickness is about 0.15 to 3 µm, preferably between 0.2 and 2 µm.

The specific surface area, measured by the BET method, is generally 0.5–30 $m^2/g$.

If aluminum platelets are employed, these preferably have an average thickness of about 0.15 to 1 µm, an average diameter of 2 to 100 µm, and a specific BET surface area of about 0.5 to 30 $m^2/g$.

The layer pack (A) comprises a colorless dielectric layer i) of a material having a refractive index n of $\leq 1.8$, and a colorless dielectric layer ii) of a material having a refractive index n of $>1.8$. Preferably the material of layer i) has an n of about 1.3 to about 1.75, and the material of layer ii) has an n of 2.0 or greater. The sequence of these layers is not stipulated and can be determined depending on the desired color effects. Surprisingly, it has been found that the sequence of layer application has a significant effect on the color properties of the resultant pigment, as discussed below. The pigments known from the prior art, which have either a layer i) or a layer ii) with an otherwise identical layer structure, i.e., a pigment having a metallic substrate, a colorless dielectric layer having a refractive index of $\leq 1.8$ or $>1.8$, but not both, and an absorbing layer, have optical properties that are essentially comparable to one another. Thus, one would have not expected that the refractive index of the dielectric layer plays a great role with regard to the optical properties of the pigments. Furthermore, one would not expect that when two layers of dielectric are applied with a low and a high refractive index onto the substrate, the sequence of the layers, i.e., whether a low refractive layer or a high refractive layer is located nearest the substrate, would make a difference.

If first a layer i) having a refractive index of $n \leq 1.8$, and then a layer ii) having a refractive index of $n > 1.8$ are applied to the metallic substrate, an increase in the intensity of the interference color and/or a broadening of the color range in which a color flop can be observed, depending on the viewing angle, is evident compared with the application of individual layers, irrespective of their refractive index, with an otherwise identical layer structure.

If, by contrast, first a layer ii) having a refractive index of $n > 1.8$, and then a layer i) having a refractive index of $n \leq 1.8$ are applied to the metallic substrate, it is possible to set a color flop, depending on the viewing angle, which does not, as is usual in the case of pigments having only one dielectric layer and an otherwise identical layer structure that are known from the prior art, exhibit a color shift from one interference color via all conceivable intermediate shades to the next interference color, but instead in which two different interference colors alternate with one another via a non-color, i.e., no intermediate hues, on a change in the viewing angle, in addition to an increase in the intensity of the interference color with an otherwise identical layer structure. Thus, for example, it is possible to set a hard color change from purple via a non-color to green.

The arrangement of the sequence of layers i) and ii), and the selection of materials for these layers and the determination of the individual thicknesses of the layers therefore give rise to a multiplicity of ways for the person skilled in the art to produce optically attractive luster pigments for a very wide variety of applications in a targeted manner. The determination of individual measures necessary for each desired purpose can be determined by the person skilled in the art depending on the particular application.

The layer pack (A) can be present one or more times in the pigments according to the invention, but preferably once. Preferably, when more than one layer pack (A) is present, no other layers are located between two layer packs (A). Layer B is located on top of the layer packs (A).

The colorless dielectric layer i) of a material having a refractive index n of $\leq 1.8$ is composed of suitable metal compounds, for example, metal oxides, metal fluorides, metal oxide hydrates, metal phosphates or mixtures thereof, which can be applied in a film-like and durable manner. Examples thereof are $SiO_2$, $SiO(OH)_2$, $Al_2O_3$, $AlO(OH)$, $B_2O_3$, $MgF_2$, $MgSiO_3$ or aluminum phosphate.

Preference is given to $SiO_2$, $Al_2O_3$ and $MgF_2$ or mixtures thereof, and particular preference is given to $SiO_2$.

The thickness of this layer is preferably greater than 150 nm to 1000 nm, more preferably 200 to 600 nm.

For the colorless dielectric layer ii) of a material having a refractive index n of $>1.8$, use is made of metal compounds, preferably metal oxides or metal sulfides, or mixtures thereof, for example $TiO_2$, $ZrO_2$, $SiO$, $CeO_2$, $HfO_2$, $Pr_2O_3$, $Y_2O_3$, $Ta_2O_5$, $ZnO$, $SnO_2$, $Ce_2O_3$, $BiOCl$ and $ZnS$, but preferably $TiO_2$ and $ZnS$, and in particular $TiO_2$. The latter may be present either in a rutile or an anatase modification. This layer has a thickness of preferably from 30 to 500 nm and in particular 200 to 350 nm.

The selectively or non-selectively absorbent layer (B) is not restricted with respect to the refractive index of the applied material or material mixture and can comprise both high-refractive-index and low-refractive-index materials. However, it is at least partially transparent to light (semi-opaque) and the various materials employed must therefore be carefully matched to the layer thickness.

Suitable materials are, in particular, metals, for example, chromium, tungsten, cobalt, nickel, copper, molybdenum, iron, silver, gold, palladium, titanium, vanadium, niobium, platinum, and also aluminum and mixtures or alloys of two or more metals.

Suitable are also metal oxides, in particular those which are absorbent per se, but also those which can be rendered absorbent by incorporation of or coating with one or more absorbent materials.

Particularly suitable metal oxides are various iron oxides, for example, magnetite, goethite or iron(III) oxides of various modifications, various cobalt oxides ($CoO$, $Co_3O_4$), chromium(III) oxide, titanium(III) oxide and the known colored titanium suboxides, various vanadium oxides ($VO_2$, $V_2O_3$), and also mixed oxides, for example, pseudobrookite ($Fe_2TiO_5$) and ilmenite ($FeTiO_3$) and mixtures thereof.

Metal oxides that can be rendered absorbent by incorporation of absorbent particles, such as carbon black or carbon, or by incorporation of selectively absorbent colorants, for example, by doping with metal cations or by coating with a film comprising a colorant, are, for example, zirconium dioxide or titanium dioxide, which can likewise be employed as a mixture with one or more of the above-mentioned substances.

For layer (B), it is also possible to employ metal sulfides, for example, cobalt sulfide, nickel sulfide, chromium sulfide, iron sulfide, tungsten sulfide, molybdenum sulfide, cerium sulfide, or mixtures thereof with one another, with metal oxides, with metals, or also with metal nitrides, for example, titanium nitride or titanium oxynitride.

The layer thickness of layer (B) is determined by the material employed and the requirement that this layer must be at least partially transparent to visible light.

For non-selectively absorbent materials, the thickness of this layer is preferably from about 5 to 100 nm, more preferably 5 to 25 nm, in particular 5 to 20 nm, which is sufficient for strongly absorbent metals, for example, chromium and molybdenum.

If, by contrast, selectively absorbent metal oxides are employed, the thickness of layer (B) is preferably from 5 to 500 nm, more preferably 10 to 100 nm.

In the present invention, layer (B) preferably comprises chromium having a layer thickness of 5 to 20 nm; $Fe_2O_3$ having a layer thickness of 10 to 100 nm; or aluminum having a layer thickness of 5 to 30 nm.

The selectively or non-selectively absorbent layer (B) attenuates the reflection of the incident visible light at the metallic substrate and amplifies the color effect set by interlayers i) and ii). In particular, in the case of incorporating the pigments according to the invention into the conventional colored coating systems, the optical advantages of these pigments are, for example, increased intensity of the interference colors together with high hiding power and metallic luster, as well as specifically set, expanded color ranges for the color flop, or an intentionally hard color change from one color to another without intermediate hues.

The luster pigments according to the invention may optionally also have an outer layer (C). This is preferably intended to protect the underlying layer (B) and to stabilise the pigments.

Materials that can be employed for the outer layer (C) are colorless or selectively absorbent metal oxides, for example, $SiO_2$, $SiO(OH)_2$, $Al_2O_3$, $AlO(OH)$, $SnO_2$, $TiO_2$, $ZrO_2$, $CeO_2$, $Fe_2O_3$ or $Cr_2O_3$, which may also be chromate-, vanadate- or phosphate-containing.

It is possible to carry out an aftertreatment, which is intended both to increase the chemical stability of the pigments and to improve their handling, in particular, to simplify incorporation into various media. Particularly suitable methods for this purpose are, for example, those described in DE 22 15 191, DE 31 51 354, DE 32 35 017, DE 33 34 598, DE 40 30 727, EP 0 649 886, WO 97/29059, WO 99/57204 and U.S. Pat. No. 5,759,255.

Layer (C) generally has a thickness of about 1 to 500 nm.

The luster pigments according to the invention may also contain an additional dielectric layer comprising metal oxides, metal fluorides, metal sulfides, metal nitrides or mixtures thereof, that is between the metallic substrate and the layer pack (A) and/or between the layer pack (A) and layer (B).

A process for the preparation of the luster pigments according to the invention may be either a process in which all layers (A), (B) and (C), in particular the layer pack (A) and layer (B), are applied to the platelet-shaped metallic support by wet-chemical methods, for example, by precipitation, by hydrolysis and/or by reduction of inorganic or organic metal compounds, or a process in which both layers (A) and (B) are applied by gas-phase decomposition of suitable compounds, or by a PVD method, or a process in which a plurality of methods are employed in combination.

A wet-chemical process only comes into question both for the layer pack (A) and for layer (B) if, besides layers i) and ii), layer (B) is also composed of materials that can be deposited by wet-chemical methods, for example of selectively absorbent metal oxides, or of certain metals.

Suitable wet-chemical methods are, for example, precipitation, hydrolysis and/or reduction of organometallic or inorganic metal compounds, for example, the coating methods developed for the production of pearlescent pigments. Methods of this type are described, for example, in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017 and other further patent documents and publications.

In the case of precipitation of inorganic metal compounds, the substrate particles are suspended in water, and one or more hydrolysable metal salts are added at a pH that is suitable for the hydrolysis. The pH is selected in such a way that the metal oxides or metal oxide hydrates are precipitated directly onto the particles without secondary precipitations occurring. The pH is usually kept constant by simultaneous metering-in of an acid or base. The pigments are subsequently separated off, washed, and dried and, optionally calcined. The temperature can be optimised with respect to the coating present in each case. The pigments may be separated off, dried, and optionally calcined after application of individual coatings and then re-suspended for the application of further layers by precipitation.

Organometallic compounds, for example, metal alkoxides, are hydrolysed in the presence of the substrate particles and in the presence of an organic solvent which is miscible with water and in which the metal compounds are soluble. If, for example, tetraethoxysilane or aluminum triisopropoxide is used, these can be hydrolytically decomposed in the presence of an alcohol, in particular isopropanol, and in the presence of aqueous ammonia as catalyst. In this way, the substrate can be coated with an $SiO_2$ or $Al_2O_3$ layer. This process is described in greater detail in DE 44 05 492.

It is also possible to deposit metal layers by wet-chemical methods. A substrate, which is generally pre-coated and has optionally been pre-treated, is introduced into a solution of a metal salt in a suitable liquid. After addition of a reducing agent, a metallic film forms on the substrate. Processes of this type are described more precisely in U.S. Pat. Nos. 3,440,075 and 3,536,520.

Furthermore, the individual layers of the pigments according to the invention can also be deposited in a fluidised-bed reactor by gas-phase coating, for example, by the processes proposed in EP 0 045 851 and EP 0 106 235 for the production of pearlescent pigments.

The individual layers may also be produced by known methods by sputtering of metals, for example, of aluminum, chromium or of alloys, for example, chromium/nickel alloys, or of metal oxides, for example, titanium oxide, silicon oxide or indium tin oxide, or by thermal evaporation of metals or metal oxides.

The application of the layers by vapor deposition will be described in greater detail below:

The layered system can be prepared on the substrate using a vapor deposition unit comprising the conventional components, such as a vacuum chamber, a vacuum pump system, pressure measurement and control units, evaporator devices, such as resistance evaporators or electron-beam evaporators, an apparatus for establishing certain pressure conditions and a gas inlet and control system for oxygen.

The high-vacuum vapor deposition technique is described in detail in Vakuum-Beschichtung [Vacuum Coating], Volumes 1–5; Editor Frey, Kienel and Löbl, VDI-Verlag 1995.

The application of the layers by the sputtering method is carried out as follows:

In the sputtering method or cathode sputtering, a gas discharge (plasma) is ignited between the support and the coating material, which is in the form of plates (target). The coating material is bombarded by high-energy ions from the plasma, for example, argon ions, and thereby removed or sputtered. The atoms or molecules of the sputtered coating material are precipitated on the substrate and form the desired thin layer.

Metals or alloys are particularly suitable for sputtering methods. These can be sputtered at comparatively high rates, in particular, by the so-called DC magnetron process. Compounds, such as oxides or suboxides, or mixtures of oxides can likewise be sputtered using high-frequency sputtering. The chemical composition of the layers is determined by the composition of the coating material (target). However, it can also be affected by additives to the gas which forms the plasma. In particular, oxide or nitride layers are produced by addition of oxygen or nitrogen in the gas space.

The structure of the layers can be influenced by suitable measures, such as bombardment of the growing layers by ions from the plasma.

The sputtering method is described in Vakuum-Beschichtung [Vacuum Coating], Volumes 1–5; Editor Frey, Kienel and Löbl, VDI-Verlag 1995.

For the production of the luster pigments according to the invention, adaptation of the high-vacuum vapor deposition process to the substrate in powder form is desired. To this end, it is desired to keep the substrate in uniform motion during the vapor deposition process in the vacuum chamber in order to ensure homogeneous coating of all particle surfaces.

This is achieved, for example, by the use of rotating containers or the use of vibration devices.

The pigments according to the invention are compatible with a multiplicity of color systems, preferably in the areas of paints, coatings and printing inks. The pigments are also suitable for the laser marking of paper and plastics and for applications in the agricultural sector, for example, for greenhouse sheeting. Because of their high tinting strength, they can also be advantageously employed in decorative cosmetics. They are also suitable for the preparation of pigment compositions and dry compositions, for example, granules, chips, pellets, briquettes, etc., which are used, for example, in printing inks and paints.

The multilayered pigments can also advantageously be used for the various applications in mixtures with commercially available pigments, for example, organic dyes, organic pigments or other pigments, for example, transparent or opaque white, colored or black pigments, or with platelet-shaped iron oxides, organic pigments, holographic pigments, LCPs (liquid crystal polymers), or transparent, colored or black luster pigments based on metal oxide-coated mica or $SiO_2$ platelets, etc. The multilayered pigments can be mixed with commercially available pigments and/or fillers in any ratio.

The luster pigments according to the invention have high hiding power and exhibit intense interference colors. Depending on the sequence of the applied layers, color effects, for example, a broadening of the color range in which color changes can be observed depending on the illumination or viewing angle, or a hard color transition from one color to another without the usual intermediate hues, can be set specifically. These advantages are particularly useful in the conventional colored coating systems which comprise conventional binders and additives.

By means of simple coating technologies, it is therefore possible to provide attractive pigments which can be advantageously employed in many areas of application.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents and publications, cited above or below, and of corresponding German application No. 10128489.6, filed Jun. 12, 2001, is hereby incorporated by reference.

EXAMPLES

Example 1

75 g of passivated aluminum flakes having particle sizes of 10–50 μm and an average thickness of 300 nm are suspended in 2 l of demineralized water and warmed to 75° C. while constantly stirring. The pH is adjusted to 7.5 using NaOH solution (3%).

750 g of dilute sodium water-glass solution ($W_{SiO2}$= 13.5%) is metered into this suspension, while the pH is kept essentially constant at 7.5 by simultaneous addition of a 20% HCl solution.

When the addition of sodium water-glass is complete, the mixture is stirred for a further 15 minutes in order to complete the precipitation. The pH is then reduced to 2.2 by dropwise addition of HCl (20%).

50 g of an aqueous $TiCl_4$ solution (167.5 g of $TiO_2$/l) are subsequently metered in, while the pH is kept essentially constant by simultaneous addition of 32% NaOH solution.

When the addition is complete, the mixture is stirred for a further 15 minutes in order to complete the precipitation.

The mixture is subsequently allowed to cool to room temperature, and the resultant pigment is filtered off, washed with demineralized water until salt-free, and dried at 110° C.

The powder is then calcined at 500° C. for 30 minutes.

A Cr layer with a thickness of 5 nm is subsequently deposited by a PVD method.

The finished pigment exhibits an intensely colored gold hue with a pronounced color flop to green-blue.

Example 2

75 g of passivated aluminum flakes having particle sizes of 10–50 μm and an average thickness of 300 nm are suspended in 380 ml of absolute ethanol and heated to 40° C. while constantly stirring. 150 g of tetraethyl orthotitanate is rapidly dissolved in 3000 ml of absolute ethanol and heated to 40° C. This solution and 113 ml of demineralised water are separately, but at the same time, metered into the aluminum flake suspension while vigorously stirring. A further 280 ml of demineralized water is subsequently metered in.

The mixture is allowed to cool to room temperature, and the resultant intermediate is filtered off, washed with ethanol, and dried at 110° C. The coated material is suspended in 2 l of demineralized water and heated to 75° C. while constantly stirring. The pH is adjusted to 7.5 using NaOH solution (3%).

1240 ml of dilute sodium water-glass solution ($W_{SiO2}$= 3.5%) is metered into this suspension, while the pH is kept essentially constant at 7.5 by simultaneous addition of a 20% HCl solution.

When the addition of sodium water-glass is complete, the mixture is stirred for a further 15 minutes in order to complete the precipitation.

The mixture is subsequently allowed to cool to room temperature, and the resultant pigment is filtered off, washed with demineralized water until salt-free, and dried at 110° C.

The powder is then calcined at 500° C. for 30 minutes.

A Cr layer with a thickness of 5 nm is subsequently deposited by a PVD method.

The finished pigment exhibits a pronounced color change from an intense purple via a non-color to an intense green.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A multilayered luster pigment comprising a metallic substrate opaque to light and reflective and a plurality of layers, each of said plurality of layers completely or essentially completely surrounding the substrate, comprising
    (A) at least one layer pack comprising
        i) a colorless dielectric layer of a material having a refractive index n of $\leq 1.8$, and
        ii) a colorless dielectric layer of a material having a refractive index n of $>1.8$, and
    (B) an absorbent layer.

2. A multilayered luster pigment according to claim 1, wherein the metallic substrate is platelet-shaped.

3. A multilayered luster pigment according to claim 1, further comprising an outer layer (C).

4. A multilayered luster pigment according to claim 1, wherein the metallic substrate comprises a metal, a metal alloy or a mixture thereof.

5. A multilayered luster pigment according to claim 1, wherein the material having a refractive index of $\leq 1.8$ for layer i) is a metal oxide, metal fluoride, metal oxide hydrate, metal phosphate or a mixture thereof.

6. A multilayered luster pigment according to claim 1, wherein the material having a refractive index n of $>1.8$ for layer ii) is a metal oxide or metal sulfide or a mixture thereof.

7. A multilayered luster pigment according to claim 1, wherein the absorbent layer comprises an at least partially light-transparent metal or a selectively absorbent metal oxide, metal sulfide, metal nitride or an alloy or a mixture thereof.

8. A multilayered luster pigment according to claim 1, wherein the metallic substrate comprises iron, steel, stainless steel, aluminum, copper, nickel, chromium, zinc, tin, silver, gold, platinum, cobalt, a lanthanide or titanium or a mixture or an alloy thereof.

9. A multilayered luster pigment according to claim 1, wherein the material having a refractive index n of $\leq 1.8$ for layer i) is $SiO_2$, $SiO(OH)_2$, $Al_2O_3$, $AlO(OH)$, $B_2O_3$, $MgF_2$, $MgSiO_3$ or aluminum phosphate or a mixture thereof.

10. A multilayered luster pigment according to claim 1, wherein the material having a refractive index n of $\leq 1.8$ for layer i) is $SiO_2$, $Al_2O_3$ or $MgF_2$ or a mixture thereof.

11. A multilayered luster pigment according to claim 1, wherein the material having a refractive index n of $\leq 1.8$ for layer i) is $SiO_2$.

12. A multilayered luster pigment according to claim 1, wherein the material having a refractive index n of $>1.8$ for layer ii) is $TiO_2$, $ZrO_2$, SiO, $CeO_2$, $HfO_2$, $Pr_2O_3$, $Y_2O_3$, $Ta_2O_5$, ZnO, $SnO_2$, $Ce_2O_3$, BiOCl or ZnS or a mixture thereof.

13. A multilayered luster pigment according to claim 1, wherein the material having a refractive index n of $>1.8$ for layer ii) is $TiO_2$ or ZnS.

14. A multilayered luster pigment according to claim 1, wherein the material having a refractive index n of $>1.8$ for layer ii) is $TiO_2$.

15. A multilayered luster pigment according to claim 1, wherein the absorbent layer (B) comprises chromium, tungsten, cobalt, nickel, copper, molybdenum, aluminum, or magnetite, goethite, iron(III) oxide, cobalt oxide, chromium (III) oxide, titanium(III) oxide, titanium suboxide, vanadium oxide, pseudobrookite, ilmenite or cobalt sulfide, nickel sulfide, chromium sulfide, iron sulfide, tungsten sulfide, molybdenum sulfide, cerium sulfide, titanium nitride, titanium oxynitride, or a mixture thereof, or an alloy of two or more metals.

16. A multilayered luster pigment according to claim 1, wherein the absorbent layer (B) comprises chromium, aluminum or iron(III) oxide.

17. A multilayered luster pigment according to claim 1, wherein layer i) has a layer thickness of greater than 150 to 1000 nm.

18. A multilayered luster pigment according to claim 1, wherein layer i) has a layer thickness of 200 to 600 nm.

19. A multilayered luster pigment according to claim 1, wherein layer ii) has a layer thickness of 30 to 500 nm.

20. A multilayered luster pigment according to claim 1, wherein layer ii) has a layer thickness of from 200 to 350 nm.

21. A multilayered luster pigment according to claim 1, wherein the layer pack (A) consists of a layer i) on the platelet-shaped metallic substrate and a layer ii) applied thereon.

22. A multilayered luster pigment according to claim 1, wherein the layer pack (A) consists of a layer ii) on the platelet-shaped metallic substrate and a layer i) applied thereon.

23. A multilayered luster pigment according to claim 1, wherein the absorbent layer is selectively absorbent.

24. A multilayered luster pigment according to claim 1, wherein the absorbent layer is non-selectively absorbent.

25. A multilayered luster pigment according to claim 3, wherein layer (C) is a colorless or selectively absorbent metal oxide.

26. A process for the preparation of a multilayered luster pigment according to claim 1, comprising coating a metallic substrate with layers (A) and (B) by a wet-chemical method, a CVD or PVD method, or by a combination thereof.

27. A process according to claim 26, wherein in the wet-chemical method is precipitation, hydrolysis or reduction of a metal salt in an aqueous or organic medium, or a combination thereof.

28. A composition that is a paint, coating, printing ink, plastic article, cosmetic, ceramic material, paper, glass, dry preparation, pigment or material for a laser, security or decorative marking comprising a pigment according to claim 1 and a suitable carrier.

* * * * *

UNITED STATES PATENT AND TRADEMARK OFFICE
CERTIFICATE OF CORRECTION

PATENT NO. : 7,060,126 B2
APPLICATION NO. : 10/166715
DATED : June 13, 2006
INVENTOR(S) : Andes et al.

It is certified that error appears in the above-identified patent and that said Letters Patent is hereby corrected as shown below:

Column 9, line 38 reads "index of" should read -- index n of --

Signed and Sealed this

Sixth Day of February, 2007

JON W. DUDAS
*Director of the United States Patent and Trademark Office*